United States Patent [19]
O'Brien et al.

[11] Patent Number: 5,819,926
[45] Date of Patent: Oct. 13, 1998

[54] PACKAGE FOR A RECORDING MEDIUM AND METHOD OF ASSEMBLING SAME

[75] Inventors: Patrick O'Brien, Maywood, N.J.; Arthur Kern, Rye, N.Y.

[73] Assignee: Ivy Hill Corporation, New York, N.Y.

[21] Appl. No.: 899,469

[22] Filed: Jul. 23, 1997

[51] Int. Cl.⁶ .................................................. B65D 85/57
[52] U.S. Cl. ...................... 206/308.1; 206/310; 206/312
[58] Field of Search ................. 206/308.1, 309, 206/310, 312, 493; 53/452, 456

[56] References Cited

U.S. PATENT DOCUMENTS

| | | |
|---|---|---|
| 1,255,690 | 2/1918 | Barlow . |
| 2,251,750 | 10/1941 | Gelardi et al. . |
| 2,663,416 | 12/1953 | Hirsch . |
| 3,229,811 | 1/1966 | Studwell . |
| 3,233,728 | 2/1966 | Johnson et al. . |
| 3,319,866 | 5/1967 | Kitchell . |
| 3,595,383 | 7/1971 | Boylan . |
| 3,785,478 | 1/1974 | Drori . |
| 3,972,417 | 8/1976 | Iten et al. . |
| 4,049,119 | 9/1977 | Wilson . |
| 4,122,945 | 10/1978 | Borzak ................. 206/493 X |
| 4,159,768 | 7/1979 | Manis et al. . |
| 4,291,801 | 9/1981 | Basili et al. . |
| 4,793,479 | 12/1988 | Otsuka et al. . |
| 4,844,247 | 7/1989 | Moy . |
| 4,874,085 | 10/1989 | Grobecker et al. . |
| 4,895,252 | 1/1990 | Nomula et al. . |
| 4,901,856 | 2/1990 | Thiele . |
| 5,238,107 | 8/1993 | Kownacki . |
| 5,249,677 | 10/1993 | Lim . |
| 5,332,089 | 7/1994 | Tillet et al. ............... 206/310 |
| 5,450,953 | 9/1995 | Reisman . |
| 5,462,158 | 10/1995 | Kramer . |
| 5,494,156 | 2/1996 | Nies . |
| 5,526,926 | 6/1996 | Deja . |
| 5,529,182 | 6/1996 | Anderson et al. . |
| 5,558,220 | 9/1996 | Gartz . |

Primary Examiner—Bryon P. Gehman
Attorney, Agent, or Firm—Amster, Rothsten & Ebenstein

[57] ABSTRACT

A method of assembling a paperboard package blank, a plastic hub and a substantially plastic recording medium includes the step of forming a sub-assembly of the package blank and the hub by mounting the hub on a first segment of a sheet from the rear thereof until the first segment of the sheet extends intermediate the back and intermediate flanges adjacent the hub central core and mounts the hub on the first segment of the sheet for movement therewith, with the hub central core front in front of the first segment of the sheet. Glue is then applied to the surface of the first segment of the sheet adjacent the hub back flange, and the first segment of the sheet and the hub are folded over an adjacent second segment of the sheet to form a panel and thereby trap the back flange within the panel intermediate the glued together first and second segments of the sheet. The recording medium is then mounted on the hub by inserting the hub central core front and the resilient detents on the hub from the rear through a central aperture of the recording medium.

11 Claims, 6 Drawing Sheets

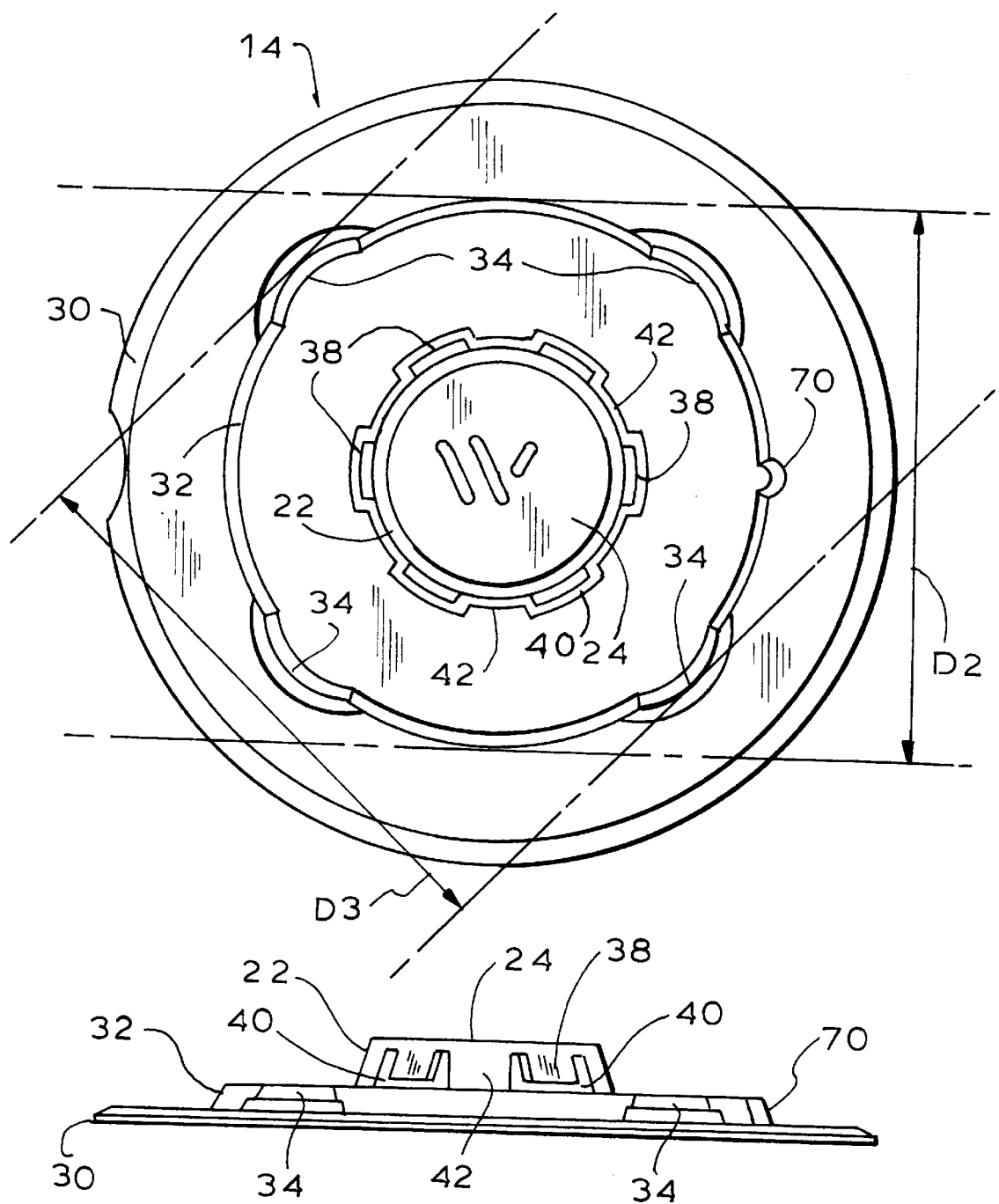

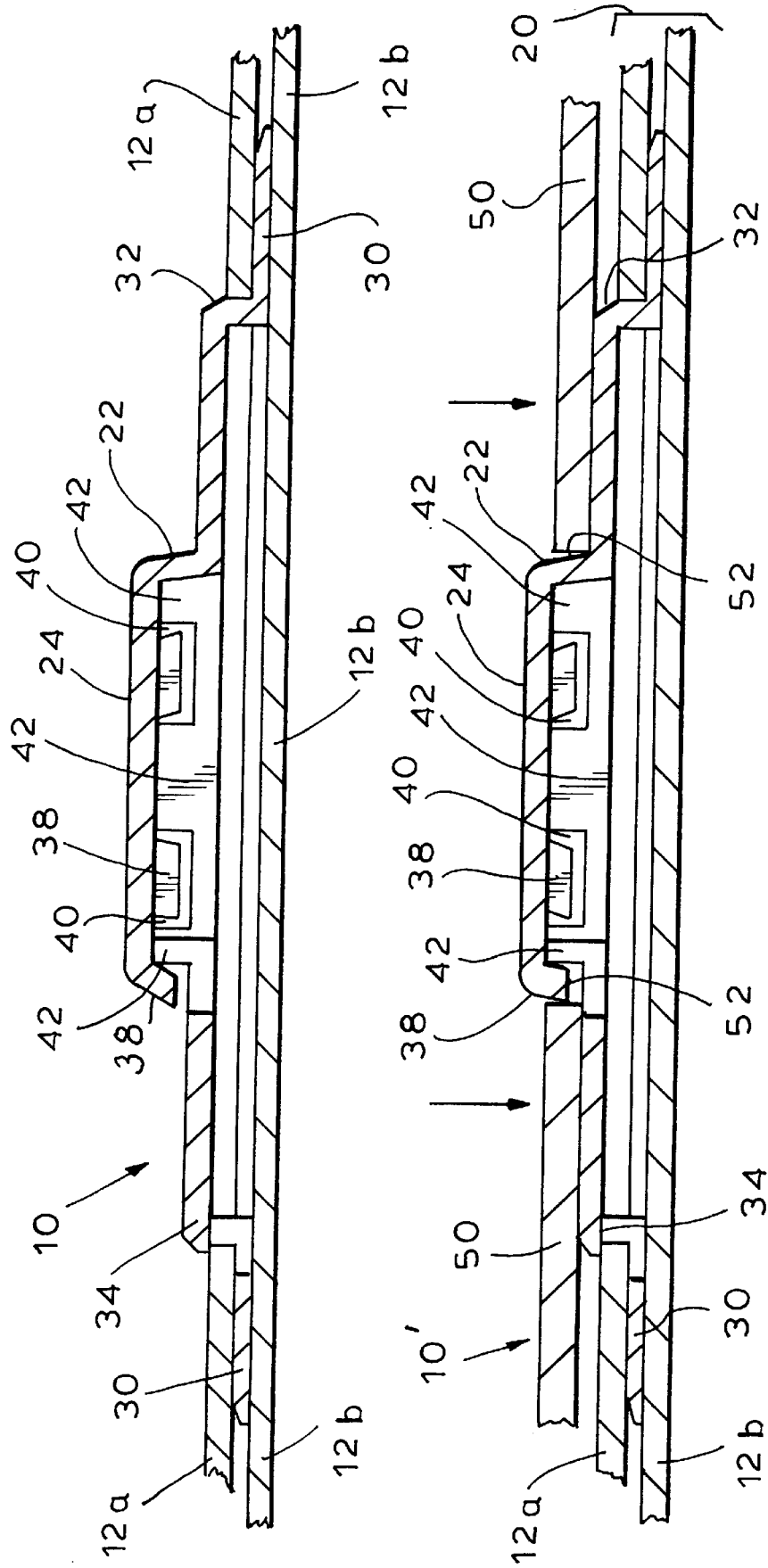

PACKAGE FOR A RECORDING MEDIUM AND METHOD OF ASSEMBLING SAME

BACKGROUND OF THE INVENTION

The present invention relates to a package for a recording medium and a method of assembling the same, and more particularly to such a package which is made from a paperboard package blank, a plastic hub and a substantially plastic recording medium.

It is well known to provide a package for a recording medium (whether the package be a simple mailer or a storage package) where the package is comprised of a plastic holder and paperboard panels formed from a blank. Typically, the holder is designed to receive and releasably retain thereon the recording medium in the form of a centrally apertured disc. Commonly the holder provides a hub in the form of a rosette having a plurality of independently flexible resilient fingers. Each of the resilient fingers is biased outwardly and has an outer surface defining undercuts which extend over the disc, when the disc is in position on the holder, thereby to releasably maintain the disc on the rosette. In order to remove the disc from the rosette, the user has only to press downwardly upon the free ends of the rosette fingers such that the rosette fingers retreat inwardly, thereby destroying the interference fit (i.e., the overlap of the undercut outer surface of the rosette fingers and the circumference of the disc central aperture).

However, the conventional package for a recording medium has not been entirely satisfactory. First, the storage packages has typically included a large amount of plastic as the plastic holder, the amount of plastic being sufficient to extend under and beyond the full bottom surface of the recording medium itself. In an industry where the annual volume of units produced is almost astronomical, the saving of even a small amount of raw material can translate into a substantial cost saving.

Second, the use of a rosette as the hub, with the free ends of the rosette fingers forming the central portion of the hub and extending through the central aperture of the recording medium, has precluded the application of advertising or like media in this prominently visible portion of the holder initially seen above the disc.

Third, because the rosette has typically employed undercut outer surfaces of the fingers to retain the recording medium on the rosette, a release of the recording medium by the rosette has not been as facile as would be desired. Typically, the release of the recording medium by the undercut rosette surface has required an accompanying upward movement by the user's fingertips on the edge of the recording medium in order to lift the recording medium entirely off the rosette. It would be highly preferable, from the point of view of the consumer, if the simple depression of the hub was sufficient to displace the hub from the recording medium, so that the recording medium was immediately free for lateral movement (i.e., removal from the package).

At the same time, the rosette design has been of great utility in an industry where the hub has to compensate for central apertures of appreciably different size in the recording medium. The tolerance for the central aperture in a compact disc is typically 0.010–0.015 inch.

In the interest of reducing the cost of manufacturing, any new package should be capable of utilizing as much as possible the existing equipment for the manufacturing of packages for a recording medium. It is common in the existing equipment for each paperboard panel to be formed by the folding over of one segment of a sheet over an adjacent segment of a sheet, the two segments then being secured together by means of glue intermediate the two segments. Typically, the plastic holder is secured by glue or like adhesives to one of the segments prior to the folding over operation.

Accordingly, it is an object of the present invention to provide a package for a recording medium which saves on the cost of plastic relative to a conventional package.

Another object is to provide such a package wherein the central hub has a closed front available for advertising or like promotional messages visible above the recording medium.

A further object is to provide such a package which facilitates one-handed separation of the recording medium from the package.

It is also an object of the present invention to provide such a package which can be assembled using existing equipment to a large degree.

It is another object to provide a method of assembling such a package.

SUMMARY OF THE INVENTION

It has now been found that the above and related objects are obtained in a method of assembling a paperboard package blank, a plastic hub and a substantially plastic recording medium. The method comprises the steps of providing a paperboard package blank configured and dimensioned to define at least one panel formed by folding of a first segment of a sheet into overlying relationship with an adjacent second segment of the sheet, the first segment being resiliently flexible and defining a central aperture therethrough for receipt of a hub therein. Also provided is a plastic hub including a central core with a front, a back flange with a diameter substantially exceeding that of the first segment central aperture, and an intermediate flange with a diameter slightly less than that of the first segment central aperture. A plurality of ears extend outwardly from the intermediate flange to provide an effective maximum diameter slightly greater than that of the first segment central aperture, and a plurality of resilient detents extend outwardly from the hub central core from a plane spaced forwardly of the intermediate flange by less than the thickness of the recording medium towards a plane containing the hub front, the detents extending upwardly and inwardly toward the hub front. Finally, a substantially plastic recording medium defining a central aperture therethrough is provided, the recording medium central aperture having a diameter slightly greater than the hub central core and slightly less than the maximum diameter of the hub central core and detents. A sub-assembly of the package blank and the hub is then formed by mounting the hub on the first segment of the sheet from the rear thereof until the first segment of the sheet extends intermediate the ears and the back flange and mounts the hub on the first segment of the sheet for movement therewith, with the hub central core front in front of the first segment of the sheet. Next, glue is applied to the surface of the first segment of the sheet adjacent the hub back flange and the first segment of the sheet and the hub are folded over the adjacent second segment of the sheet to form a panel and thereby trap the back flange within the panel intermediate the glued together first and second segments of the sheet. Finally, the recording medium is mounted on the hub by inserting the hub central core front and resilient detents from the rear through the recording medium central aperture.

In a preferred embodiment of the method, the intermediate flange has two pairs of diametrically opposed ears extending outwardly, the hub has three pairs of diametrically opposed detents extending outwardly from the hub central core, and the central core has a closed, substantially imperforate front.

The present invention also encompasses an assembly of a folded paperboard package blank, a plastic hub and a substantially plastic recording medium. The folded paperboard package blank defines at least one panel formed by folding of a first segment of a sheet into overlying relationship with an adjacent second segment of the sheet, the first segment being resiliently flexible and defining a central aperture therethrough for receipt of a hub therein. The plastic hub includes a central core with a front, a back flange with a diameter substantially exceeding that of the first segment central aperture, and an intermediate flange with a diameter slightly less than that of the first segment central aperture. A plurality of ears extend from the intermediate flange outwardly to provide an effective maximum diameter slightly greater than that of the first segment central aperture, and a plurality of resilient detents extend outwardly from the hub central core from a plane spaced forwardly of the intermediate flange by less than the thickness of the recording medium towards a plane containing the hub front, the detents extending upwardly and inwardly toward the hub front. The substantially plastic recording medium defines a central aperture therethrough, the recording medium central aperture having a diameter slightly greater than the hub central core and slightly less than the maximum diameter of the hub central core and detents, and being mounted on the hub central core and the detents.

The present invention additionally includes a method of forming the assembly. The first step is forming a sub-assembly of the folded package blank and the plastic hub by mounting the hub on the first segment of the sheet from the rear thereof until the first segment of the sheet extends intermediate the back and intermediate flanges adjacent the hub central core and mounts the hub on the first segment of the sheet for movement therewith, with the hub central core front in front of the first segment of the sheet. The second step is applying glue to the surface of the first segment of the sheet adjacent the hub back flange and folding the first segment of sheet and the hub over the adjacent second segment of the sheet to form a panel and thereby trap the back flange within the panel intermediate the glued together first and second segments of the sheet. The third step is mounting the recording medium on the hub by inserting the hub central core front and resilient detents of the hub from the rear through the recording medium central aperture.

BRIEF DESCRIPTION OF THE DRAWING

The above and related objects, features and advantages of the present invention will be more fully understood by reference to the following detailed description of the presently preferred, albeit illustrative, embodiments of the present invention when taken in conjunction with the accompanying drawing wherein:

FIGS. 5 and 6 are top plan and side elevational views, respectively, to an enlarged scale, of the plastic hub;

FIG. 7 is a sectional view, to an enlarged scale, taken along the line 7—7 of FIG. 3; and FIG. 8 is a sectional view, to an enlarged scale, taken along the line 8—8 of FIG. 4.

DETAILED DESCRIPTION OF THE PREFERRED EMBODIMENTS

Figure 1:
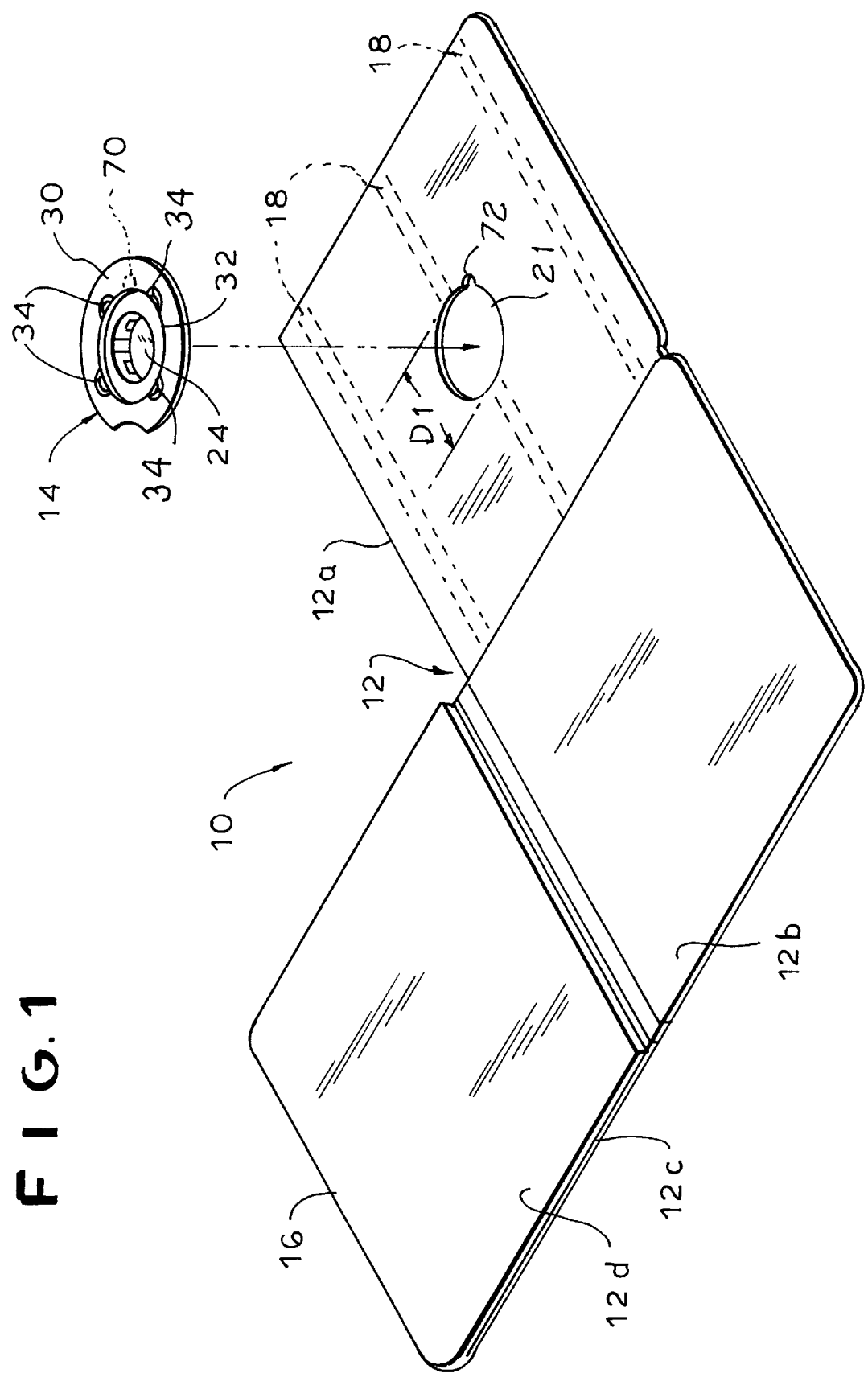
FIG. 1 is an isometric view of the sub-assembly showing the plastic hub about to be inserted into a partially folded paperboard package blank.

Referring now to FIG. 1, therein illustrated is a sub-assembly according to the present invention, generally designated by the reference numeral 10. The sub-assembly 10 comprises a paperboard package blank generally designated 12 and a substantially plastic hub generally designated 14.

The paperboard package blank 12 is illustrated as a 1×3 blank—that is, a blank having two horizontal rows, the first row having a single first segment 12a therein and the second row having three segments 12b–12d connected by foldlines, one end segment 12b thereof being connected to the first segment 12a of the first row by a foldline. As will be readily apparent to those skilled in the blank art, blanks of other configurations (such as a 1×2×1 blank may be utilized instead). The 12d segment is folded laterally over the 12c segment with a glue (such as a hot melt glue, not shown) being disposed at the interface to secure the two segments 12c, 12d together as a panel 16. Eventually the first segment 12a will be folded down and over the second segment 12b, with glue being disposed at the interface thereof (for example, in three glue strips 18), thereby to form a second panel 20 (best illustrated in FIG. 3). Such folded paperboard package blanks are well known in the art and hence may not be described here in further detail except to note that the segment 12a (and typically each of the segments 12a–12b) is resiliently flexible and that segment 12a (but not the other segments 12b–12d) defines a central aperture 21 therethrough for receipt of the hub 14 therein as described hereinbelow.

Figure 4:
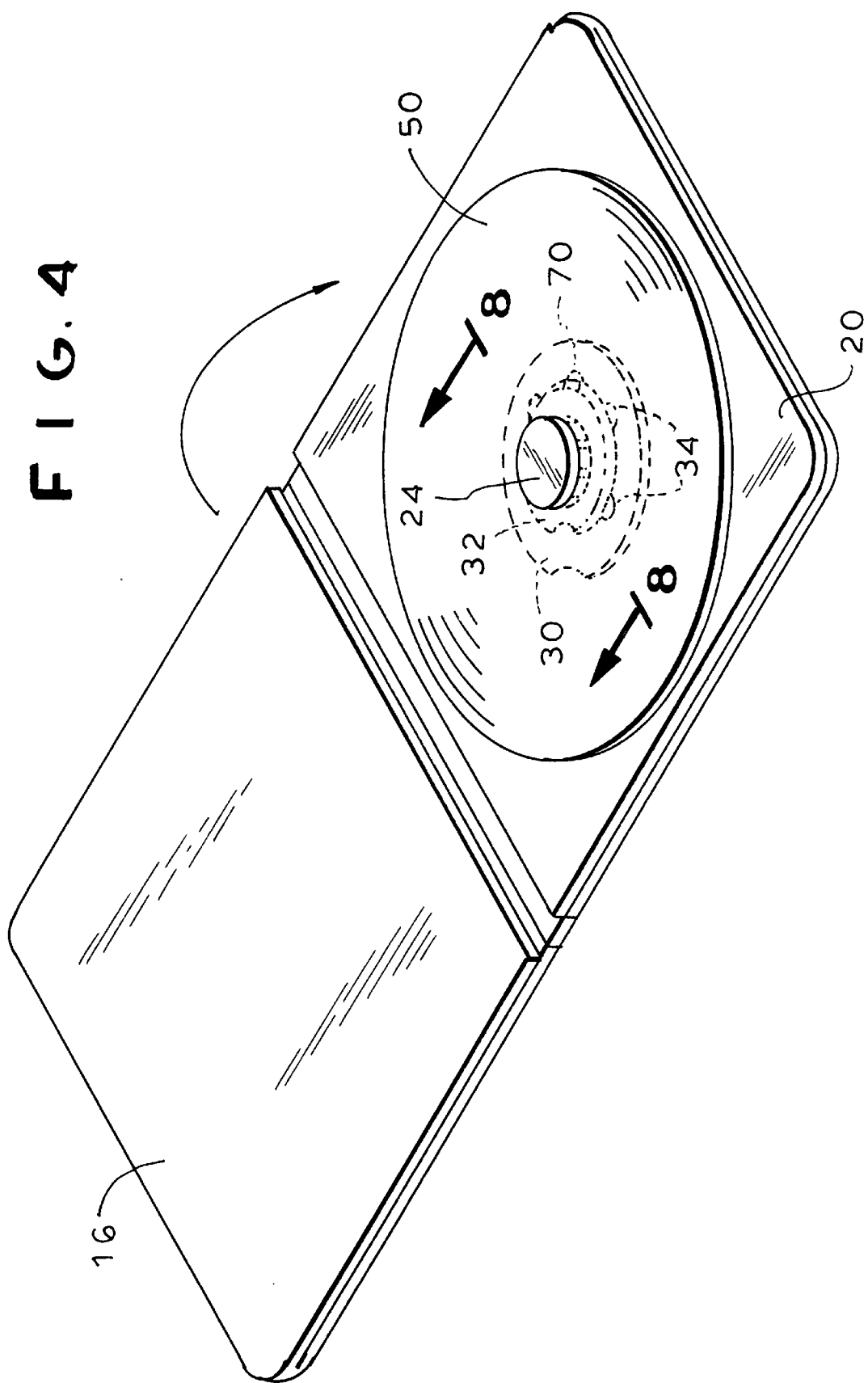
FIG. 4 is a view similar to FIG. 3 but after the recording medium is fixed on the hub, the two panels being shown about to be folded one over another.

Referring now to FIGS. 5 and 6, therein illustrated is the substantially plastic hub 14. The hub 14 defines a central core 22 having a front 24 which is preferably closed and substantially imperforate so that advertising, instructions or the like may be placed thereon for ready viewing when the package is opened, just above the surface of the recording medium, as illustrated in FIG. 4. As illustrated, the words IVY HILL are printed on the front 24, but clearly other advertising, instructions, or the like may be disposed thereon. The central core 22 has a diameter which is smaller than the central aperture of the recording medium, thereby to enable its passage into such central aperture.

The hub 14 additionally includes a back or bottom flange 30 and an intermediate flange 32 between the back flange 30 and the front 24. The back flange 30 has a diameter substantially exceeding that of the first segment central aperture 21 (see FIG. 1). On the other hand, the intermediate flange 32 has a diameter slightly less than that of the first segment central aperture 21. However, a plurality of ears 34 (two pairs of diametrically opposed ears 34 being illustrated) extend outwardly from the intermediate flange 32 to provide an effective maximum diameter for the intermediate flange 32 and ears 34 slightly greater than that of the first segment central aperture 21. The minimum difference between the effective maximum diameter D3 (including the ears) and the diameter D2 (not including the ears) need be only about one or two millimeters for the purposes of the present invention.

A plurality of resilient detents 38 extend outwardly and downwardly from the hub central core 22 from a plane spaced forwardly of the intermediate flange 22 by less than the thickness of the recording medium towards a plane containing the hub front 24. More particularly, the detents 38 extend upwardly and inwardly toward the hub front 24 or, seen another way, downwardly and outwardly towards the back flange 30. As illustrated, there are three pairs of diametrically opposed detents 38 such that the detents 38 are preferably equally spaced apart about the circumference of the central core 22. Each detent 38 is defined by a U-shaped cutout 40 in the central core 22, with struts 42 remaining between each adjacent pair of detents 38.

As illustrated in FIGS. 7 and 8, the ears 34 may be integral with the intermediate flange 32, and the detents 38 may be integral with the hub central core 22.

An assembly according to the present invention, generally designated 10', is formed by combining the sub-assembly 10 with a conventional centrally apertured recording medium 50. More particularly, the recording medium 50 is substantially plastic and defines a central aperture 52 therethrough which has a diameter slightly greater than the hub central core 22 (excluding the resilient detents 38) and slightly less than the maximum diameter of the hub central core 22 (including the detents 38). The thickness of the recording medium 50 exceeds the gap between the bottom of the detents 38 and the top of the intermediate flange 32 so that the detents 38 cannot extend over (overhang) the recording medium 50. As centrally apertured recording media are well known in the art, it is not deemed necessary to provide further details thereof herein.

Figure 2:
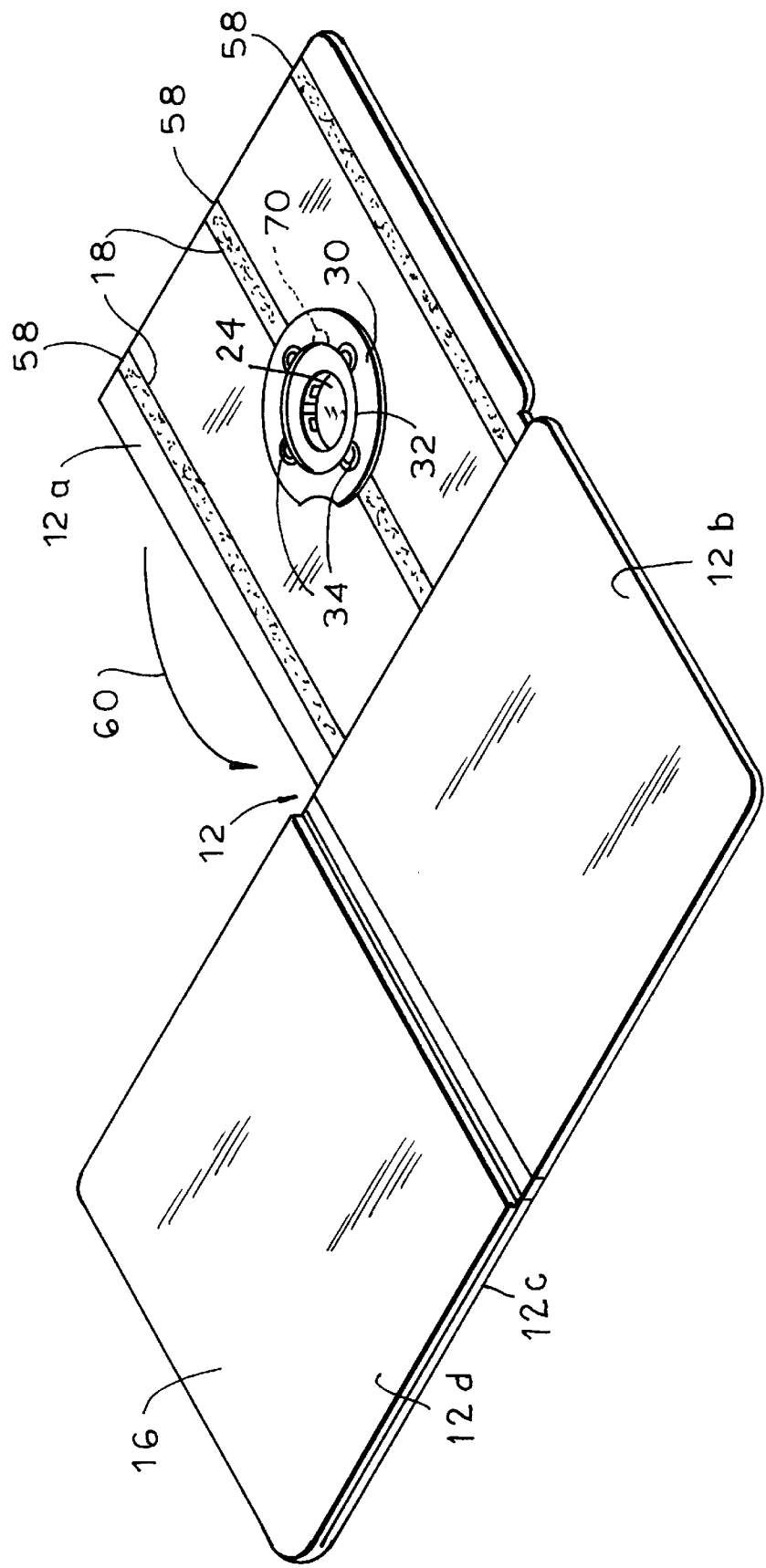
FIG. 2 is a view similar to FIG. 1 but after the hub is fully inserted into the paperboard blank.

Referring now to FIGS. 1 and 2 again, therein illustrated is the method of forming the sub-assembly 10 of the partially folded package blank 12 and the hub 14. The hub 14, and in particular the front 24 thereof, is mounted on the apertured segment 12a from the rear thereof (the rear being shown as having the glue lines 18) until the aperture-bordering portions of the segment 12a flex forwardly to allow passage thereby of the intermediate flange 32 and the ears 34 protruding therefrom. Further, pushing of the hub 14 onto the segment 12a from the rear allows the temporarily flexed portions of the resilient segment 12a defining the central aperture 21 to immediately straighten out intermediate back flange 30 and the ears 34, thereby mounting the hub 14 on the segments 12a without glue. The partial disposition of the segment 12a intermediate the ears 34 and the back or rear flange 30 serves to mount the hub 14 on the segment 12a for movement therewith, with the hub central core front 24 in front of the segment 12a.

It will be appreciated that the mounting of the hub 14 on the segment 12a is not dependent upon the flexibility of any portion of the hub 14 itself, but relies instead on the resilient flexibility of the paperboard segment 12a which must initially flex away from and then return to its normal orientation, now under the ears 34.

Next, glue (such as hot melt adhesive) is applied to the surface of the first segment 12a adjacent the hub back flange 30, and then both the first segment 12a and the hub 14 are folded (in the direction of arrow 60) over the adjacent second segment 12b of the sheet 12 to form panel 20. Thus, panel 20 traps the back flange 30 within the panel 20 intermediate glued together segments 12a, 12b of the sheet. The glue 58 maintains the integrity of panel 20 and the capture of the hub 14 thereby. The panel 20 thus formed is preferably compressed about the hub 14, for example, using a pair of compression belts (not shown), one on either side of the back flange 30, to press the first and second segments 12a, 12b against one another before the glue hardens.

It will be appreciated that the diameter D3 of the ears 34 (on the intermediate flange 32) exceeds the diameter D1 of the first segment central aperture 21, just as the first segment central aperture 21 diameter D1 exceeds the intermediate flange diameter D2 (without the ears 34).

Because the central core front 24 is closed and substantially imperforate, the user's line of sight is blocked from seeing any glue which may exist between the segments 12a, 12b of the panel 20 during the process of removing the recording medium 50 from, or inserting it on, the hub 14.

As much of the conventional equipment for manufacturing the packages for recording media expect the holder- or hub-bearing segment and the holder or hub to be moveable as a unit during folding of the blank 12, such equipment may be easily used to manufacture the package of the present invention.

Figure 3:
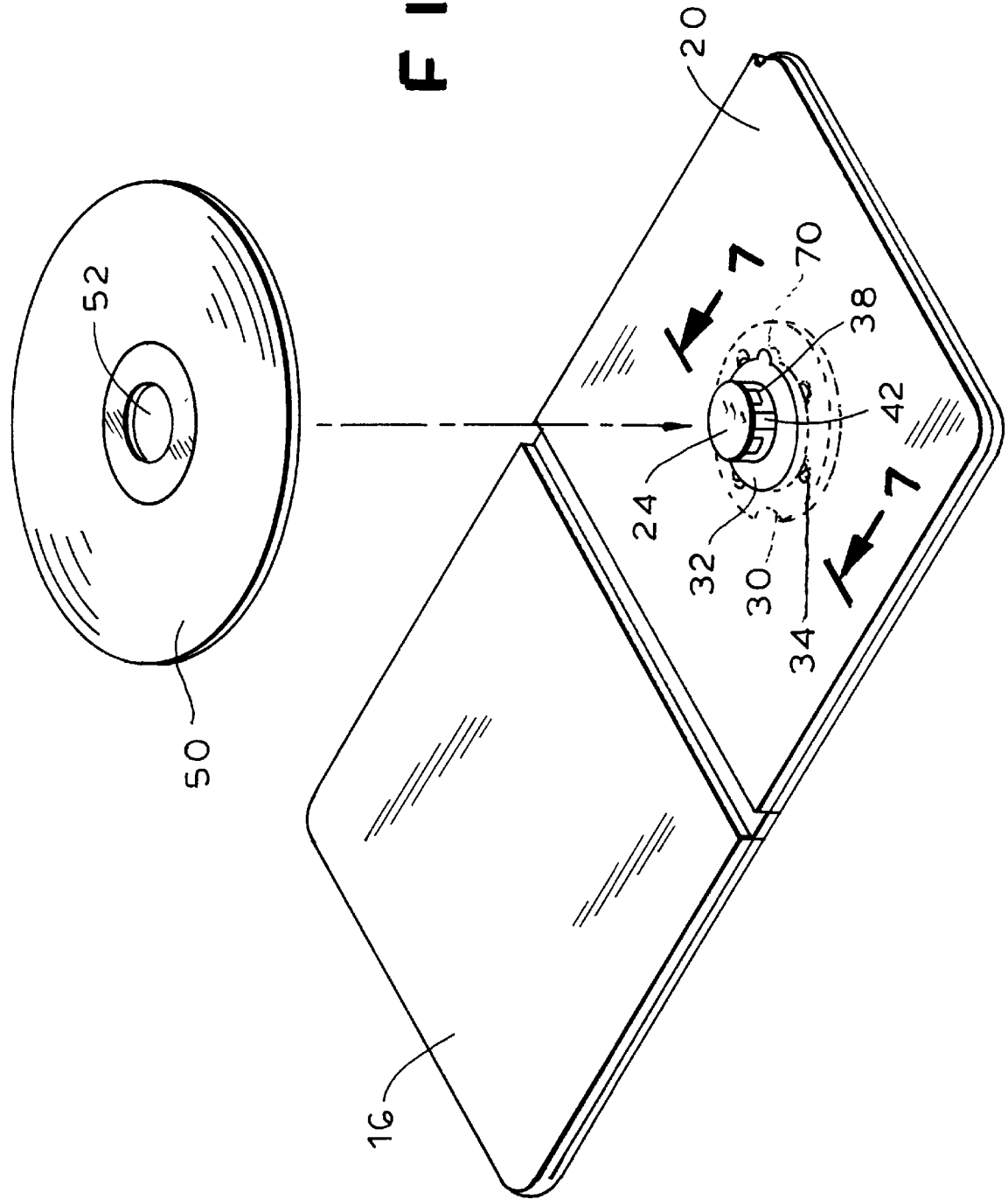
FIG. 3 is a view similar to FIG. 2 but after one segment of the hub-bearing panel has been folded over and glued to another segment, with a recording medium being shown aligned with the hub.

Referring now to FIG. 3, the recording medium 50 having a central aperture 52 may then be placed over the upstanding front portion of the hub 14, and in particular the central core 22 and the plurality of resilient detents 38 extending outwardly therefrom, and then pressed downwardly in the direction of the arrow to form the assembly 10'.

As illustrated in FIG. 4, finally the panel 16 is swung (in the direction of arrow 62) over the panel 20 and the recording medium 50. Because the recording medium central aperture 52 has a diameter only slightly greater than the hub central core 22 and slightly less than the maximum diameter of the hub central core and the detents 38, the recording medium 50 is frictionally maintained on the hub 14, and more particularly on the outer surface of the detents 38 thereof. Generally, the folded package 10' is wrapped in a heat shrunk or like plastic wrap, the wrap further acting to maintain the panels 11, 20 together with the recording medium 50 trapped on the hub 14 therebetween.

Because the storage medium does not extend under undercut fingers of the hub, removal of the storage medium from the package (and particularly the hub) is relatively simple, even using only one hand. The user has only to press downwardly on the hub central core front 24 (which may have thereon the instruction "PUSH"), and the hub front 24 will relocate from its initial plane to a new plane entirely below the plane occupied by the recording medium 50, because the center of the folded paperboard panel 20 allows the hub front 24 to be depressed further then the surrounding area of the folded paperboard panel 20 will allow the recording medium 50 thereover to be depressed. In other words, downward thumb pressure on the front 24 will dislodge the hub 14 from the recording medium 50, even as the remainder of the user's hand supports the peripheral margin of the panel 20, and hence the recording medium 50, against the natural tendency of the recording medium 50 to travel with the hub 14 (due to the friction between the recording medium and the resilient detents 38 which press outwardly and upwardly on the outer circumference of the recording medium central aperture 21).

In order to facilitate automation of the assembly process, preferably the hub 14 is provided with a moldgate notch or projection 70 extending radially outwardly from the otherwise circular circumference of the intermediate flange 32 intermediate a pair of ears 34, and the first segment 12a is provided with a registering notch 72 extending outwardly from the otherwise circular circumference of the central aperture 21 and adapted to receive the moldgate projection 70 therein. The object of the moldgate projection 70 and registering notch 72 (or a registering pin on the first segment and corresponding notch on the hub) is to enable the automated orientation of the hub 14 relative to the first segment 12a such that the logo or advertising disposed on the hub front 24 is in the proper orientation for reading or viewing.

To summarize, the present invention provides a package for a recording medium which saves on the cost of plastic relative to a conventional package and provides the central hub with a closed front available for advertising or a like promotional message visible just above the recording medium. Further, the package facilitates a one-handed separation of the recording medium from the package. The package can be assembled using existing package-forming equipment to a large degree.

Now that the preferred embodiments of the present invention have been shown and described in detail, various modifications and improvements thereon will become immediately apparent to those skilled in the art. Accordingly, the present invention is to be construed broadly and limited only by the appended claims, and not by the foregoing specification.

We claim:

1. A method of assembling a paperboard package blank, a plastic hub and a substantially plastic recording medium; the method comprising the steps of:
   (A) providing a paperboard package blank configured and dimensioned to define at least one panel formed by folding of a first segment of a sheet into overlying relationship with an adjacent second segment of the sheet, the first segment being resiliently flexible and defining a central aperture of a given diameter therethrough for receipt of a hub therein;
   (B) providing a plastic hub defining a forward front and a rear back and including:
      (i) a central core with a front;
      (ii) a back flange with a diameter substantially exceeding that of the first segment central aperture;
      (iii) an intermediate flange with a diameter slightly less than that of the first segment central aperture;
      (iv) a plurality of ears extending outwardly from the intermediate flange to provide an effective maximum diameter slightly greater than that of the first segment central aperture; and
      (v) a plurality of resilient detents extending outwardly and rearwardly from the hub central core and from a plane spaced forwardly of the intermediate flange by less than the thickness of the recording medium towards a plane containing the hub front, the detents extending inwardly and forwardly toward the hub front;
   (C) providing a substantially plastic recording medium defining a central aperture therethrough, the recording medium central aperture having a diameter slightly greater than the hub central core and slightly less than the maximum diameter of the hub central core and detents;
   (D) forming a sub-assembly of the package blank and the hub by mounting the hub on the first segment of the sheet from the rear thereof until the first segment of the sheet extends intermediate the back and intermediate flanges adjacent the hub central core and mounts the hub on the first segment of the sheet for movement therewith with the hub central core front in front of the first segment of the sheet;
   (E) applying glue to the surface of the first segment of the sheet adjacent the hub back flange and folding the first segment of the sheet and the hub over the adjacent second segment of the sheet to form a panel by gluing together the first and second segments of the sheet and thereby trap the back flange within the panel intermediate the glued together first and second segments of the sheet; and
   (F) mounting the recording medium on the hub by inserting the hub central core front and resilient detents from the rear through the recording medium central aperture.

2. The method of claim 1 wherein the intermediate flange has two pairs of diametrically opposed ears extending outwardly.

3. The method of claim 1 wherein the hub has three pairs of diametrically opposed detents extending outwardly from the hub central core.

4. The method of claim 1 wherein the central core has a closed, substantially imperforate front.

5. An assembly of a folded paperboard package blank, a plastic hub and a substantially plastic recording medium; the assembly comprising:
   (A) said folded paperboard package blank defining at least one panel formed by folding of a first segment of a sheet into overlying relationship with an adjacent second segment of the sheet, said first segment being resiliently flexible and defining a central aperture of a given diameter therethrough for receipt of a hub therein;
   (B) said plastic hub defining a forward front and a rear back and including:
      (i) a central core with a front;
      (ii) a back flange with a diameter substantially exceeding that of said first segment central aperture and being disposed intermediate said first and second segments;
      (iii) an intermediate flange with a diameter slightly less than that of said first segment central aperture;
      (iv) a plurality of ears extending outwardly from said intermediate flange to provide an effective maximum diameter slightly greater than that of said first segment central aperture; and
      (v) a plurality of resilient detents extending outwardly and rearwardly from said hub central core and from a plane spaced forwardly of said intermediate flange by less than the thickness of said recording medium towards a plane containing said hub front, said detents extending inwardly and forwardly toward said hub front; and
   (C) said substantially plastic recording medium defining a central aperture therethrough, said recording medium central aperture having a diameter slightly greater than said hub central core and slightly less than the maximum diameter of said hub central core and detents, and being mounted on said hub central core intermediate said detents and said ears.

6. The assembly of claim 5 wherein said intermediate flange has two pairs of diametrically opposed ears extending outwardly.

7. The assembly of claim 5 wherein said hub has three pairs of diametrically opposed detents extending outwardly from said hub central core.

8. The assembly of claim 5 wherein said central core has a closed, substantially imperforate front.

9. A method of forming the assembly of claim 5, including the steps of
   (a) forming a sub-assembly of said folded package blank and said plastic hub by mounting said hub on said first segment of said sheet from the rear thereof until said first segment of said sheet extends intermediate said back and intermediate flanges adjacent said hub central core and mounts said hub on said first segment of said sheet for movement therewith, with said hub central core front in front of said first segment of said sheet;

(b) applying glue to the surface of said first segment of said sheet adjacent said hub back flange and folding said first segment of sheet and said hub over said adjacent second segment of said sheet to form a panel by gluing together the first and second segments of the sheet and thereby trap said back flange within said panel intermediate said glued together first and second segments of said sheet; and (c) mounting said recording medium on said hub by inserting said hub central core front and resilient detents of said hub from the rear through said recording medium central aperture.

10. A method of forming the assembly of claim 5, including the steps of (a) forming a sub-assembly of said folded package blank and said plastic hub by mounting said hub on said first segment of said sheet until said first segment of said sheet extends intermediate said back and intermediate flanges adjacent said hub central core and mounts said hub on said first segment of said sheet for movement therewith, with said hub central core front in front of said first segment of said sheet;

(b) applying glue to the surface of said first segment of said sheet adjacent said hub back flange and folding said first segment of sheet and said hub over said adjacent second segment of said sheet to form a panel by gluing together the first and second segments of the sheet and thereby trap said back flange within said panel intermediate said glued together first and second segments of said sheet; and (c) mounting said recording medium on said hub by inserting said hub central core front and resilient detents of said hub from the rear through said recording medium central aperture.

11. A method of assembling a paperboard package blank, a plastic hub and a substantially plastic recording medium; the method comprising the steps of:

(A) providing a paperboard package blank configured and dimensioned to define at least one panel formed by folding of a first segment of a sheet into overlying relationship with an adjacent second segment of the sheet, the first segment being resiliently flexible and defining a central aperture of a given diameter therethrough for receipt of a hub therein;

(B) providing a plastic hub defining a forward front and a rear back and including:
 (i) a central core with a front;
 (ii) a back flange with a diameter substantially exceeding that of the first segment central aperture;
 (iii) an intermediate flange with a diameter slightly less than that of the first segment central aperture;
 (iv) a plurality of ears extending outwardly from the intermediate flange to provide an effective maximum diameter slightly greater than that of the first segment central aperture; and
 (v) a plurality of resilient detents extending outwardly and rearwardly from the hub central core and from a plane spaced forwardly of the intermediate flange by less than the thickness of the recording medium towards a plane containing the hub front, the detents extending inwardly and forwardly toward the hub front;

(C) providing a substantially plastic recording medium defining a central aperture therethrough, the recording medium central aperture having a diameter slightly greater than the hub central core and slightly less than the maximum diameter of the hub central core and detents;

(D) forming a sub-assembly of the package blank and the hub by mounting the hub on the first segment of the sheet until the first segment of the sheet extends intermediate the back and intermediate flanges adjacent the hub central core and mounts the hub on the first segment of the sheet for movement therewith with the hub central core front in front of the first segment of the sheet;

(E) applying glue to the surface of the first segment of the sheet adjacent the hub back flange and folding the first segment of the sheet and the hub over the adjacent second segment of the sheet to form a panel by gluing together the first and second segments of the sheet and thereby trap the back flange within the panel intermediate the glued together first and second segments of the sheet; and (F) mounting the recording medium on the hub by inserting the hub central core front and resilient detents from the rear through the recording medium central aperture.

* * * * *